United States Patent
Cordero et al.

(10) Patent No.: US 12,146,591 B2
(45) Date of Patent: Nov. 19, 2024

(54) THREADED CONNECTION FOR EXPLORATION AND PRODUCTION OF A HYDROCARBON WELL

(71) Applicant: Hydril Company, Houston, TX (US)

(72) Inventors: Jorge Alberto Cordero, Amsterdam (NL); David Mutis Rueda, Houston, TX (US)

(73) Assignee: Hydril Company, Houston, TX (US)

( * ) Notice: Subject to any disclaimer, the term of this patent is extended or adjusted under 35 U.S.C. 154(b) by 223 days.

(21) Appl. No.: 17/626,396

(22) PCT Filed: Jul. 13, 2020

(86) PCT No.: PCT/US2020/041757
§ 371 (c)(1),
(2) Date: Jan. 11, 2022

(87) PCT Pub. No.: WO2021/011443
PCT Pub. Date: Jan. 21, 2021

(65) Prior Publication Data
US 2022/0290784 A1    Sep. 15, 2022

Related U.S. Application Data

(60) Provisional application No. 62/873,594, filed on Jul. 12, 2019.

(30) Foreign Application Priority Data

Sep. 10, 2019  (NL) .................................. N2023800

(51) Int. Cl.
*F16L 15/06*    (2006.01)
*F16L 15/00*    (2006.01)
*E21B 17/042*   (2006.01)

(52) U.S. Cl.
CPC ............. *F16L 15/002* (2013.01); *F16L 15/06* (2013.01); *E21B 17/042* (2013.01)

(58) Field of Classification Search
CPC ......... F16L 15/002; F16L 15/06; F16L 15/00; E21B 17/042
See application file for complete search history.

(56) References Cited

U.S. PATENT DOCUMENTS

| | | | |
|---|---|---|---|
| 3,989,284 A | 11/1976 | Blose | |
| 4,473,245 A * | 9/1984 | Raulins | E21B 17/042 285/332.3 |

(Continued)

FOREIGN PATENT DOCUMENTS

| | | |
|---|---|---|
| EP | 0147358 | 7/1985 |
| EP | 0151574 | 9/1988 |

(Continued)

OTHER PUBLICATIONS

"Special Threaded- and-Coupled Joints", World Oil, Gulf Publishing Company, Houston, TX, Jan. 1, 1991, 212(1):1-22.

(Continued)

*Primary Examiner* — David Bochna
(74) *Attorney, Agent, or Firm* — Morgan, Lewis & Bockius LLP

(57) ABSTRACT

A threaded connection for exploration and production of a hydrocarbon well and comprising a coupling member, a first tubular member and a second tubular member, wherein the coupling member has a coupling outer diameter, a first box part with first inner threads, and a second box part with second inner threads, the first tubular member has a first unthreaded tube part, and a first pin part with first outer threads, the second tubular member has a second unthreaded tube part, and a second pin part with second outer threads, the first inner threads and the first outer threads are configured to form a first inner primary seal at final make-up, and (Continued)

Figure 1A:
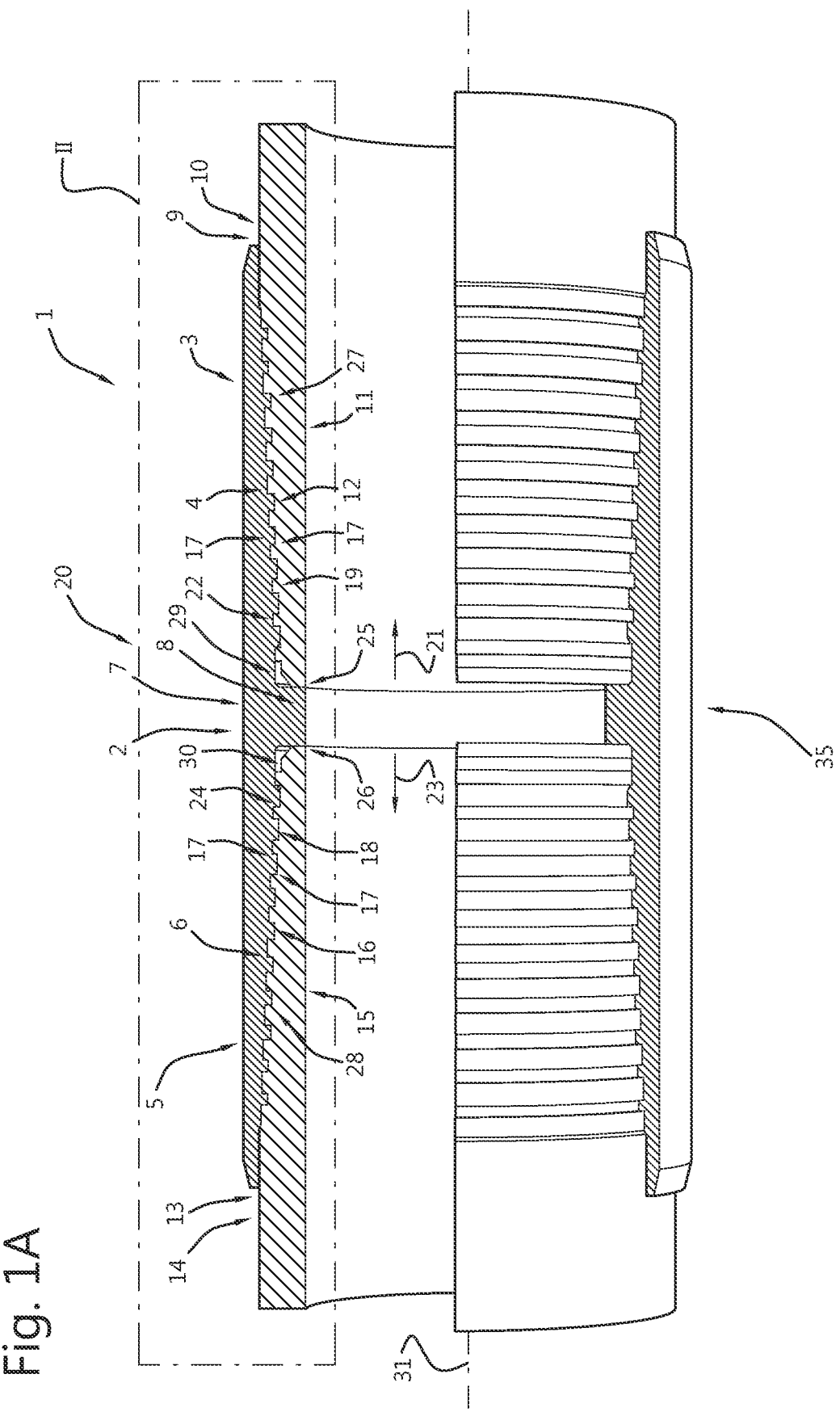

the second inner threads and the second outer threads are configured to form a second inner primary seal at final make-up.

23 Claims, 9 Drawing Sheets

(56) References Cited

U.S. PATENT DOCUMENTS

| | | | |
|---|---|---|---|
| 4,917,409 A | | 4/1990 | Reeves |
| 4,988,127 A | * | 1/1991 | Cartensen ............. E21B 17/042 285/94 |
| 6,312,024 B1 | | 11/2001 | Dutilleul et al. |
| 8,136,846 B2 | | 3/2012 | Church et al. |
| 2006/0061099 A1 | | 3/2006 | Evans et al. |
| 2016/0123508 A1 | * | 5/2016 | Tejeda ................. E21B 17/042 285/390 |
| 2021/0332917 A1 | * | 10/2021 | Sugino ................. E21B 17/042 |
| 2022/0163143 A1 | * | 5/2022 | Oku ........................ F16L 15/06 |

FOREIGN PATENT DOCUMENTS

| | | |
|---|---|---|
| WO | WO2017024208 | 2/2017 |
| WO | WO2017100026 | 6/2017 |

OTHER PUBLICATIONS

PCT International Search Report and Written Opinion in International Appln. No. PCT/US2020/041757, dated Nov. 11, 2020, 33 pages.

International Preliminary Report on Patentability in International Appln. No. PCT/US2020/041757, dated Jan. 27, 2022, 21 pages.

* cited by examiner

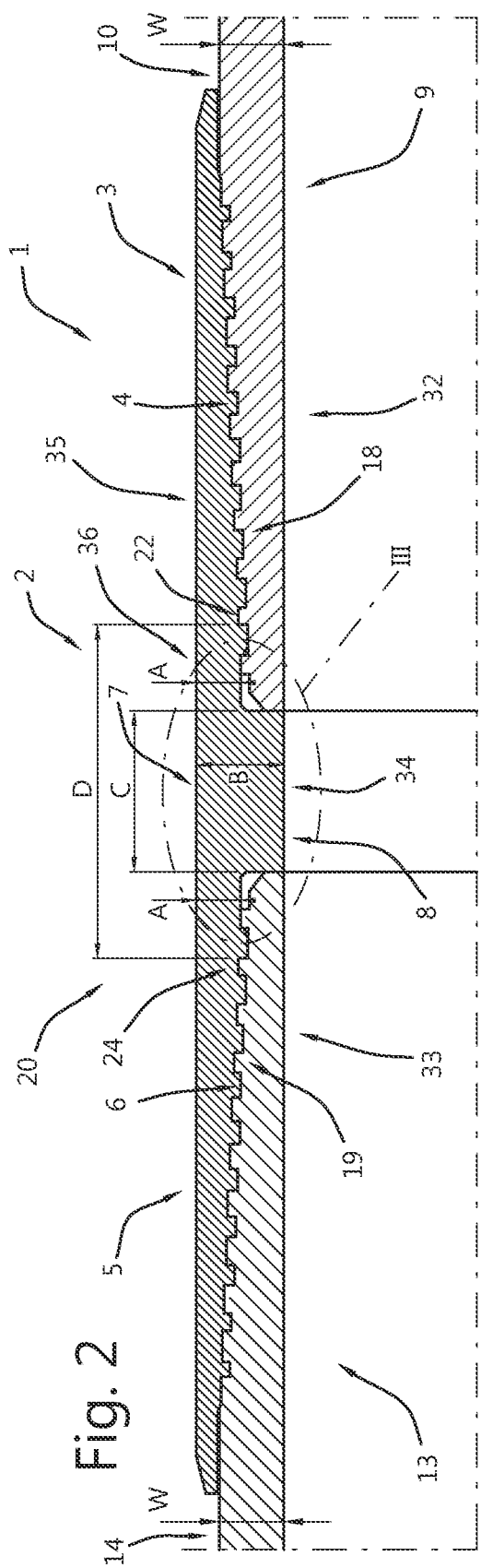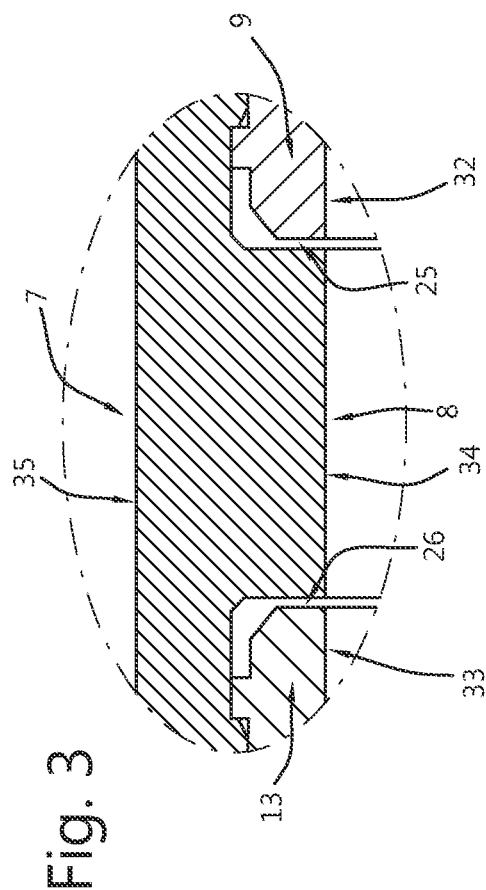

THREADED CONNECTION FOR EXPLORATION AND PRODUCTION OF A HYDROCARBON WELL

CLAIM OF PRIORITY

This application is a U.S. National Phase Application under 35 U.S.C. § 371 and claims the benefit of priority to International Application Serial No. PCT/US2020/041757, filed Jul. 13, 2020, which claims priority to U.S. Patent Application No. 62/873,594 filed on Jul. 12, 2019, and Dutch Patent Application No. NL2023800 filed on Sep. 10, 2019, the entire contents of which are hereby incorporated by reference.

FIELD OF THE INVENTION

The invention relates to a threaded connection for exploration and production of a hydrocarbon well and comprising a coupling member, a first tubular member and a second tubular member. Such a threaded connection comprising a coupling member for coupling the first and second tubular members end-to-end is also referred to as a "threaded and coupled" connection.

In the known threaded connection, the coupling member has a coupling outer diameter COD, a first box part with first inner threads, and a second box part with second inner threads. The first box part and the second box part have a radial box part thickness A located between the first inner threads and the second inner threads. The first tubular member has a first unthreaded tube part, and a first pin part with first outer threads. The second tubular member has a second unthreaded tube part, and a second pin part with second outer threads. The first unthreaded tube part and the second unthreaded tube part have a tube outer diameter TOD and a radial tube wall thickness W. The coupling outer diameter COD is larger than the tube outer diameter TOD. The first inner threads, the second inner threads, the first outer threads, and the second outer threads have dovetail wedge threads. The first inner threads and the first outer threads are configured to form a first inner primary seal at final make-up. The second inner threads and the second outer threads are configured to form a second inner primary seal at final make-up.

The first and second inner primary seals form at final make-up the first line of defence against internal pressure in the threaded connection.

BACKGROUND OF THE INVENTION

In some situations, the known threaded connection has too large an outside diameter for use in exploration and/or production of specific smaller diameter hydrocarbon wells, such as so-called slender profiled hydrocarbon wells sometimes referred to as slim-hole wellbores or slim-hole completions.

SUMMARY OF THE INVENTION

The invention has the objective to provide an improved, or at least alternative, threaded connection, which can be used in said specific smaller diameter hydrocarbon wells.

This objective is reached by a threaded connection for exploration and production of a hydrocarbon well and comprising;
a coupling member having a coupling outer diameter COD and comprising
a first box part comprising first inner threads,
a second box part comprising second inner threads, and
a rim part comprising a radially extending inner rim, wherein the rim part is located between the first box part and the second box part and has a radial rim part thickness B and an axial rim part length C, and
the first box part and the second box part have a radial box part thickness A located between the inner rim and, respectively, the first inner threads and the second inner threads,
a first tubular member comprising a first unthreaded tube part, and a first pin part comprising first outer threads, and
a second tubular member comprising a second unthreaded tube part, and a second pin part comprising second outer threads, wherein
the first unthreaded tube part and the second unthreaded tube part have a tube outer diameter TOD and a radial tube wall thickness W,
the first tubular member and the second tubular member have a tube inner diameter TID,
the first inner threads, the second inner threads, the first outer threads, and the second outer threads have dovetail wedge threads,
the first inner threads and the first outer threads are configured to form a first inner primary seal at final make-up,
the second inner threads and the second outer threads are configured to form a second inner primary seal at final make-up, and
the threaded connection complies to;

$COD > TOD$ $B = \text{about}((COD-TID)/2)$ $C > 0$, and $A < W$.

$COD > TOD$ indicates that the coupling outer diameter COD of the coupling member is larger than the tube outer diameter TOD of the first unthreaded tube part of the first tubular member and the second unthreaded tube part of the second tubular member.

When compared with the known threaded connection, the rim part has been added between the first box part and the second box part. The rim part thickness B of the rim part is measured in radial direction with respect to a longitudinal axis of the threaded connection and the rim part length C is measured in axial direction.

$B = (COD-TID)/2$ indicates that the rim part extends from the coupling outer diameter COD of the coupling member up to the tube inner diameter TID of the first tube member and the second tube member. This facilitates the flowing of fluid through the threaded connection. That B is "about" the value of $(COD-TID)/2$ is to express that B may differ from the value of $(COD-TID)/2$ to an extent that the difference does not interfere with the function of the rim and the functioning of the connection. The difference may for instance be the result of machine tolerances.

$C > 0$ indicates that that the rim part with an axial rim part length C has been added to the threaded connection.

A threaded connection according to the invention comprising a coupling member for coupling a first and a second tubular member end-to-end is also referred to as a "threaded and coupled" connection.

The functioning of the first and second inner primary seals can be impaired when the internal pressures of fluids flowing through the threaded connection are too high and separate the first inner threads from the first outer threads and the second inner threads from the second outer threads.

In order to withstand these high internal pressures, the coupling member of the known threaded connection has a relatively large radial box part thickness A measured between the first inner threads and the second inner threads of the coupling member.

In the known threaded connection, the radial box part thickness A is larger than the radial tube wall thickness W of the first unthreaded tube part of the first tubular member and the second unthreaded tube part of the second tubular member. This results in a relatively large coupling outer diameter.

The separation of the first inner threads from the first outer threads and the second inner threads from the second outer threads is caused by the radial deformation created by the internal pressures of the fluids flowing through the threaded connection. The invention is based on the insight that said radial deformation is associated with the hoop stresses in the threaded connection and that these hoop stresses can be reduced by addition of the rim part of the threaded connection according to the invention.

This means that by adding the rim part to the known threaded connection, the radial box part thickness A of the coupling member can be reduced while ensuring that the first inner primary seal between the first inner threads and the first outer threads and the second inner primary seal between the second inner threads and the second outer threads is maintained. As a result, the radial box part thickness A of the first and second box parts of the coupling member of the threaded connection according to the invention is smaller than the radial tube wall thickness W of the first and second unthreaded tube parts of the first and second tubular members. This is indicated by A<W.

The reduced radial box part thickness A can be achieved by removing material at the outer coupling surface of the coupling member while keeping the first and second inner threads of the coupling member and the tubular members unchanged. This way, the coupling outer diameter COD is reduced and the threaded connection can be used in said specific smaller hydrocarbon wells, even if standardised tubular members are used.

In an embodiment of the threaded connection, the axial rim part length C of the rim part complies to; C≤31.75 mm (1.25 inch), preferably C≤27.94 mm (1.1 inch), more preferably C≤25.4 mm (1.0 inch).

In an embodiment of the threaded connection, the axial rim part length C of the rim part complies to; C≥6.35 mm (0.25 inch), preferably C≥10.16 mm (0.4 inch), more preferably C≥12.7 mm (0.5 inch).

In an embodiment of the threaded connection, the axial rim part length C of the rim part complies to; 20.32 mm (0.8 inch)≤C≤27.94 mm (1.1 inch), preferably C=25.4 mm (1.0 inch)

In an embodiment of the threaded connection, the threaded connection complies to; A≤0.9 W, preferably A≤0.8 W. This indicates that the radial box part thickness A is smaller than or equal to 90%, preferably 80%, of the radial tube wall thickness W.

In an embodiment of the threaded connection, the threaded connection complies to; A≥0.7 W. This indicates that the radial box part thickness A is larger than or equal to 70% of the radial tube wall thickness W.

In an embodiment of the threaded connection, the radial box part thickness A is located at the critical cross section of the first box part and the second box part. In an embodiment of the threaded connection, the tube outer diameter TOD of the first and second unthreaded tube parts of the first and second tubular members complies to; 114.3 mm (4.5 inch) ≤TOD≤244.5 mm (9⅝ inch), preferably 114.3 mm (4.5 inch)≤TOD≤193.7 mm (7.625 inch), more preferably 114.3 mm (4.5 inch) TOD 139.7 mm (5.5 inch).

In an embodiment of the threaded connection, the radial tube wall thickness W of the first and second unthreaded tube parts of the first and second tubular members complies to: 6.3 mm (0.250 inch)≤W≤12.7 mm (0.500 inch), preferably 7.3 mm (0.290 inch)≤W≤11.1 mm (0.437 inch).

In an embodiment of the threaded connection, the threaded connection comprises the features that in a first direction from the inner rim and towards the first inner primary seal, the first inner threads and the first outer threads start to have full contact at a first seal starting position, in an opposite second direction from the inner rim and towards the second inner primary seal, the second inner threads and the second outer threads start to have full contact at a second seal starting position, the first seal starting position is located at an axial seal distance D from the second seal starting position, and D>C.

In an embodiment of the threaded connection, the threaded connection complies to: 3.6 mm (0.142 inch)≤(D−C)/2≤9.9 mm (0.392 inch). This indicates that the first and second seal starting positions are located at an axial distance from the rim part of more than or equal to 3.6 mm (0.142 inch) and less than or equal to 9.9 mm (0.392 inch). Preferably, the threaded connection complies to: 5 mm (0.2 inch)≤(D−C)/2≤7.7 mm (0.3 inch), more preferably (D−C)/2 is 6.1 mm (0.242 inch).

In an embodiment of the threaded connection, the radially extending inner rim is located between the first pin part and the second pin part.

In an embodiment of the threaded connection, the first tubular member (more specifically, the first pin part) comprises a first pin nose, the second tubular member (more specifically, the second pin part) comprises a second pin nose, and at final make-up the first pine nose and the second pin nose are located at a distance from the inner rim.

In an embodiment of the threaded connection, the radially extending inner rim is located between the first pin nose and the second pin nose.

In an embodiment of the threaded connection, the threaded connection is at final make-up free from any further inner seal (in addition to the first inner primary seal and the second inner primary seal).

In an embodiment of the threaded connection, the threaded connection is at final make-up free from any further secondary seal or metal-to-metal seal (in addition to the first inner primary seal and the second inner primary seal and the engagement of the complete threads).

In an embodiment of the threaded connection, the first inner threads and the first outer threads together form a first thread step, and the second inner threads and the second outer threads together form a second thread step.

In an embodiment of the threaded connection, the threaded connection is free from any further thread step (in addition to the first thread step and the second thread step). The first thread step and the second thread step are both single thread steps.

In an embodiment of the threaded connection, the first thread step and the second thread steps are tapered thread steps.

In an embodiment of the threaded connection:
the threaded connection defines a longitudinal axis,
the first inner threads has a constant first inner threads taper angle $\alpha_1$ with respect to the longitudinal axis,
the first outer threads has a constant first outer threads taper angle $\beta_1$ with respect to the longitudinal axis,
the first inner threads taper angle $\alpha_1$ and the first outer threads taper angle $\beta_1$ are equal to each other,
the second inner threads has a constant second inner threads taper angle $\alpha_2$ with respect to the longitudinal axis,
the second outer threads has a constant second outer threads taper angle $\beta_2$ with respect to the longitudinal axis, and
the second inner threads taper angle $\alpha_2$ and the second outer threads taper angle $\beta_2$ are equal to each other.

In an embodiment of the threaded connection, the first inner threads taper angle $\alpha_1$, the first outer threads taper angle $\beta_1$, the second inner threads taper angle $\alpha_2$, and the second outer threads taper angle $\beta_2$ have a diametrical taper of between, and including, 0.36 and 0.86 mm/revolution (0.014 and 0.034 inch/revolution), preferably between, and including, 0.51 and 0.71 mm/revolution (0.020 and 0.028 inch/revolution).

In an embodiment of the threaded connection, the first inner threads and the first outer threads are configured to have a first radial thread interference at final make-up, and the second inner threads and the second outer threads are configured to have a second radial thread interference at final make-up.

In an embodiment of the threaded connection:
the threaded connection defines a longitudinal axis,
the first inner threads has a constant first inner threads taper angle $\alpha_1$ with respect to the longitudinal axis,
the first outer threads has a constant first outer threads taper angle $\beta_1$ with respect to the longitudinal axis,
the first inner threads taper angle $\alpha_1$ is larger than the first outer threads taper angle $\beta_1$,
the second inner threads has a constant second inner threads taper angle $\alpha_2$ with respect to the longitudinal axis,
the second outer threads has a constant second outer threads taper angle $\beta_2$ with respect to the longitudinal axis, and
the second inner threads taper angle $\alpha_2$ is larger than the second outer threads taper angle $\beta_2$.

In an embodiment of the threaded connection, the first inner threads taper angle $\alpha_1$ and the second inner threads taper angle $\alpha_2$ have a diametrical inner taper of between, and including, 0.41 and 0.91 mm/revolution (0.016 and 0.036 inch/revolution), preferably between, and including, 0.56 and 0.76 mm/revolution (0.022 and 0.030 inch/revolution), and the first outer threads taper angle $\beta_1$ and the second outer threads taper angle $\beta_2$ have a diametrical outer taper of between, and including, 0.36 and 0.86 mm/revolution (0.014 and 0.034 inch/revolution), preferably between, and including, 0.51 and 0.71 mm/revolution (0.020 and 0.028 inch/revolution).

In an embodiment of the threaded connection:
the first inner threads and the first outer threads are configured to have a first radial thread interference at final make-up,
the first radial thread interference between the first inner threads and the first outer threads decreases in a first direction from the inner rim and towards the first inner primary seal,
the second inner threads and the second outer threads are configured to have a second radial thread interference at final make-up, and
the second radial thread interference between the second inner threads and the second outer threads decreases in an opposite second direction from the inner rim and towards the second inner primary seal.

The part "first direction from the inner rim and towards the first inner primary seal" indicates the direction of the first direction. It does not indicate that the first direction starts at the inner rim and/or ends at the first inner primary seal. The part "second direction from the inner rim and towards the second inner primary seal" indicates the direction of the second direction. It does not indicate that the second direction starts at the inner rim and/or ends at the second inner primary seal.

In an embodiment of the threaded connection:
the first radial thread interference between the first inner threads and the first outer threads decreases in the first direction until a first radial thread interference value of zero is reached, and
the second radial thread interference between the second inner threads and the second outer threads decreases in the second direction until a second radial thread interference value of zero is reached.

In an embodiment of the threaded connection:
the first inner threads and the first outer threads are in the first direction and beyond a first thread location where the first radial thread interference value of zero is reached free from a first radial thread clearance between the first inner threads and the first outer threads, and
the second inner threads and the second outer threads are in the second direction and beyond a second thread location where the second radial thread interference value of zero is reached free from a second radial thread clearance between the second inner threads and the second outer threads.

In an embodiment of the threaded connection:
the first inner threads and the first outer threads have in the first direction and beyond a first thread location where the first radial thread interference value of zero is reached a first radial thread clearance between the first inner threads and the first outer threads, and
the second inner threads and the second outer threads have in the second direction and beyond a second thread location where the second radial thread interference value of zero is reached a second radial thread clearance between the second inner threads and the second outer threads.

In an embodiment of the threaded connection, the coupling member comprises a first relief groove located between the first inner threads and the inner rim and a second relief groove located between the second inner threads and the inner rim. More specifically, the first relief groove is in axial direction along the longitudinal axis located between the first inner threads and the inner rim and the second relief groove is in axial direction along the longitudinal axis located between the second inner threads and the inner rim. The first and second relief grooves are during the production process of the coupling member used by the lathe tools to move away from the first and second inner threads and out of the coupling member without damaging the radially extending inner rim after the first and second inner threads are formed.

In an embodiment of the threaded connection, the radial box part thickness A of the first box part and the second box part is located at the first relief groove and at the second relief groove, respectively.

In an embodiment of the threaded connection, the coupling outer diameter COD is the largest diametric dimension of the threaded connection.

In an embodiment of the threaded connection, the rim part has a rim inner diameter RID and the threaded connection complies to; RID=about TID. This indicates that the rim part, more specifically the inner rim, is flush or near flush with the first and second tubular members. That the RID is about the value of TID is to express that RID may differ from TID to an extent that the difference does not interfere with the function of the rim and the functioning of the connection. The difference between TID and RID may for instance be the result of machine tolerances. In a preferred embodiment RID=TID±0.127 mm (0.050 inch). In a more preferred embodiment RID=TID.

In an embodiment of the threaded connection, the rim part has a rim outer diameter ROD and the threaded connection complies to: B=(ROD−RID)/2. This indicates that the radial rim part thickness B extends from the rim outer diameter ROD up to the rim inner diameter RID.

In an embodiment of the threaded connection, the threaded connection complies to; COD=ROD. This indicates that the coupling outer diameter COD and the rim outer diameter ROD are equal to each other.

In an embodiment of the threaded connection, the first box part has a first box outer diameter FBOD, the second box part has a second box outer diameter SBOD, and the threaded connection complies to; COD=FBOD=SBOD. This indicates that the coupling outer diameter COD, the first box outer diameter FBOD, and the second box outer diameter SBOD are equal to each other.

In an embodiment of the threaded connection, the threaded connection defines a longitudinal axis.

In an embodiment of the threaded connection, the radial box part thickness A of the first box part and the second box part is in axial direction along the longitudinal axis located between the inner rim and the first inner threads and the second inner threads, respectively.

In an embodiment of the threaded connection, the radial box part thickness A of the first box part and the second box part is measured in radial direction with respect to the longitudinal axis.

In an embodiment of the threaded connection, the coupling member comprises an outer coupling surface which defines the coupling outer diameter COD and the radial box part thickness A of the first box part and the second box part is measured from the outer coupling surface.

In an embodiment of the threaded connection, the outer coupling surface forms an outer thickness boundary of the radial box part thickness A of the first box part and the second box part.

In an embodiment of the threaded connection, the first pin part of the first tubular member is in axial direction along the longitudinal axis located between the inner rim and the first unthreaded tube part, and the second pin part of the second tubular member is in axial direction along the longitudinal axis located between the inner rim and the second unthreaded tube part.

In an embodiment of the threaded connection, the rim part and the inner rim completely surround the longitudinal axis.

In an embodiment of the threaded connection, the rim part comprises a rim inner surface which is near flush, preferably flush, with a first tube inner surface of the first tubular member and a second tube inner surface of the second tubular member.

It will be clear to the skilled person that the threaded connection according to the invention may comprise a combination of the features of any of the above defined embodiments of the threaded connection.

BRIEF DESCRIPTION OF THE INVENTION

Figure 1B:
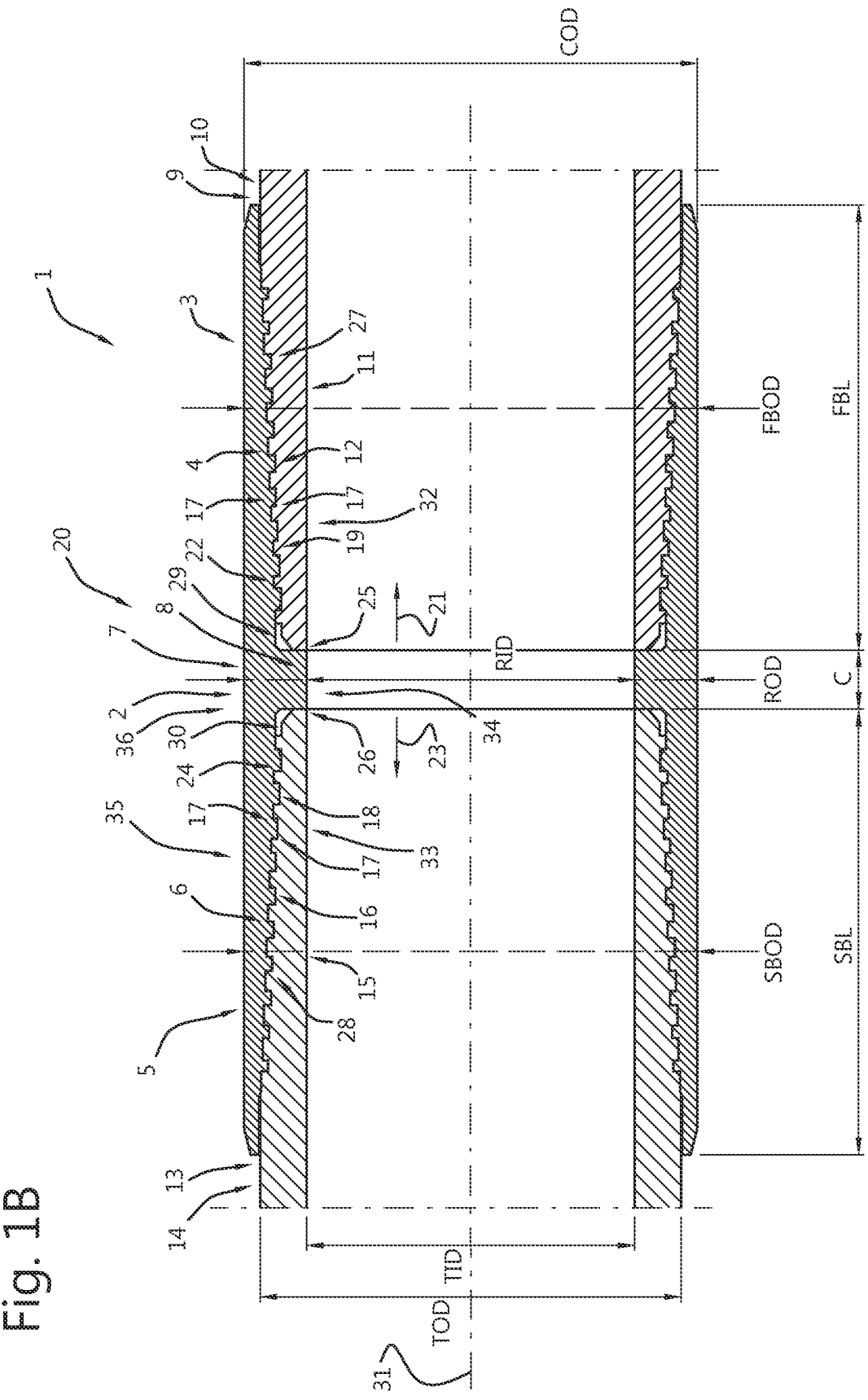

Embodiments of the threaded connection according to the invention will be described by way of example only, wherein reference to the accompanying schematic drawings in which corresponding reference symbols indicate corresponding parts, and in which:

FIG. 1A schematically shows a view in perspective of an embodiment of the threaded connection according to the invention, FIG. 1B schematically shows a cross sectional view of the threaded connection of FIG. 1A, FIG. 2 schematically shows an enlarged view of part II of FIG. 1.

FIG. 3 schematically shows an enlarged view of part III of FIG. 2.

Figure 4:
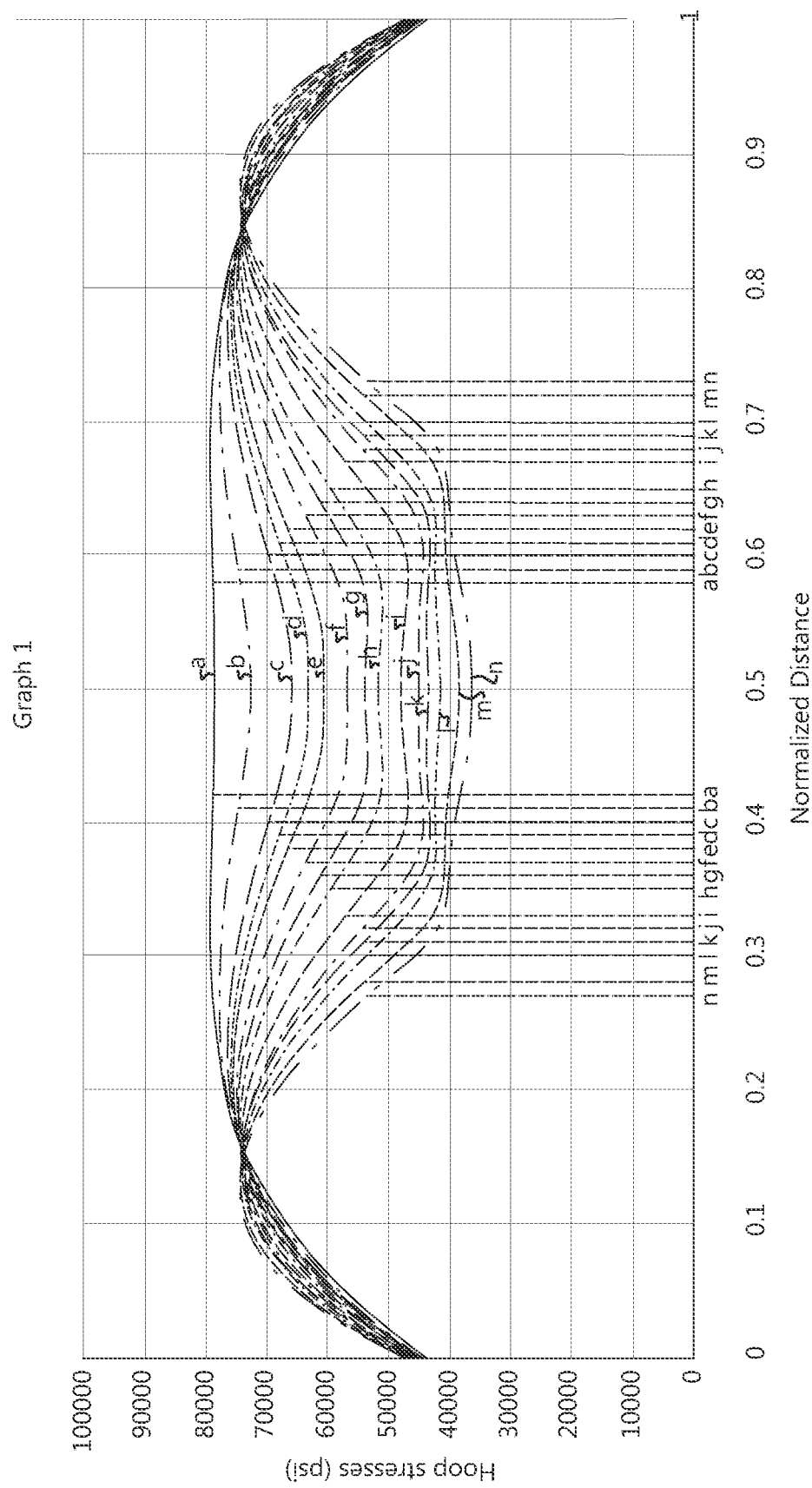
Figure 5:
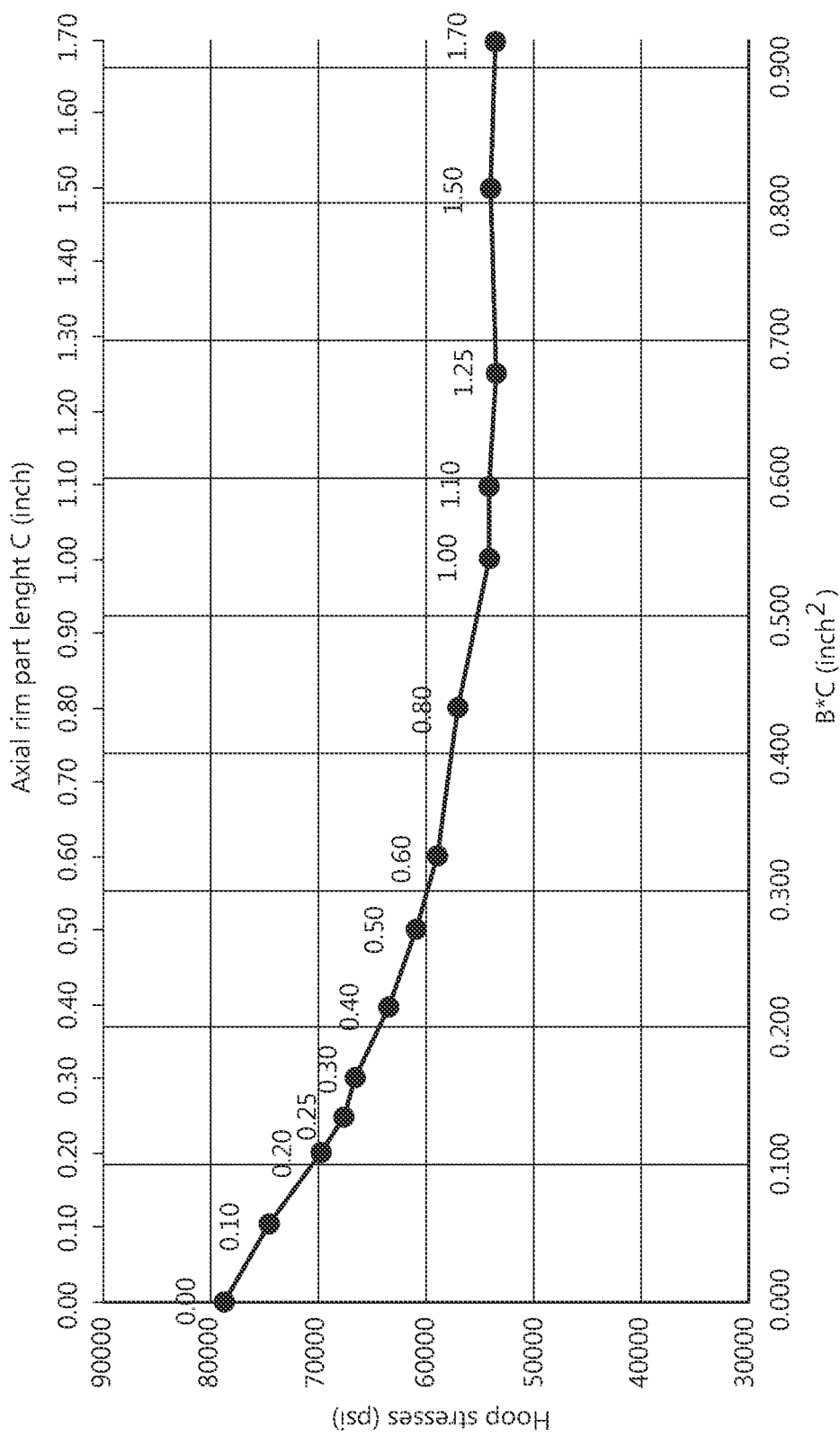
Figure 6:
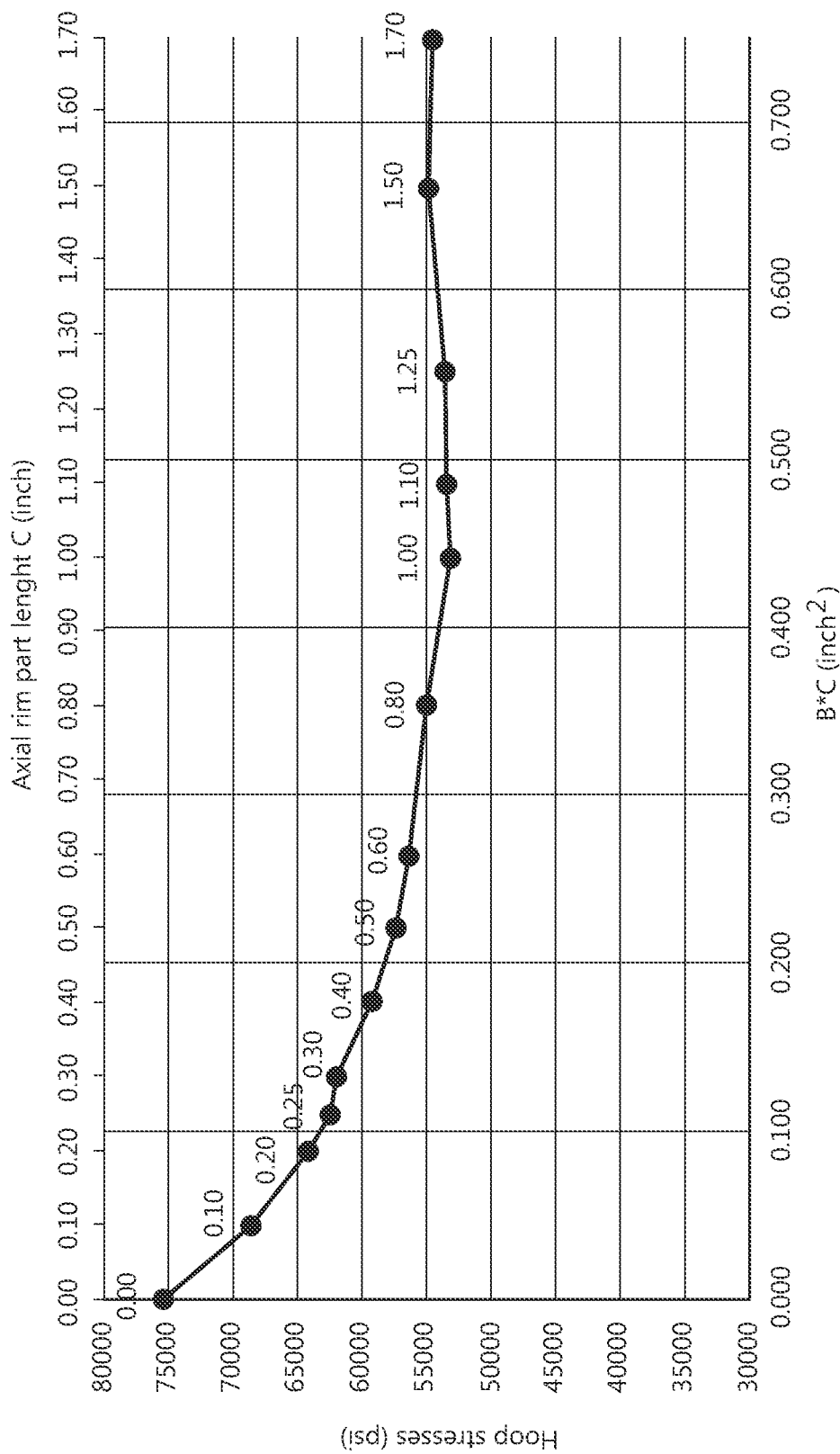
Figure 7:
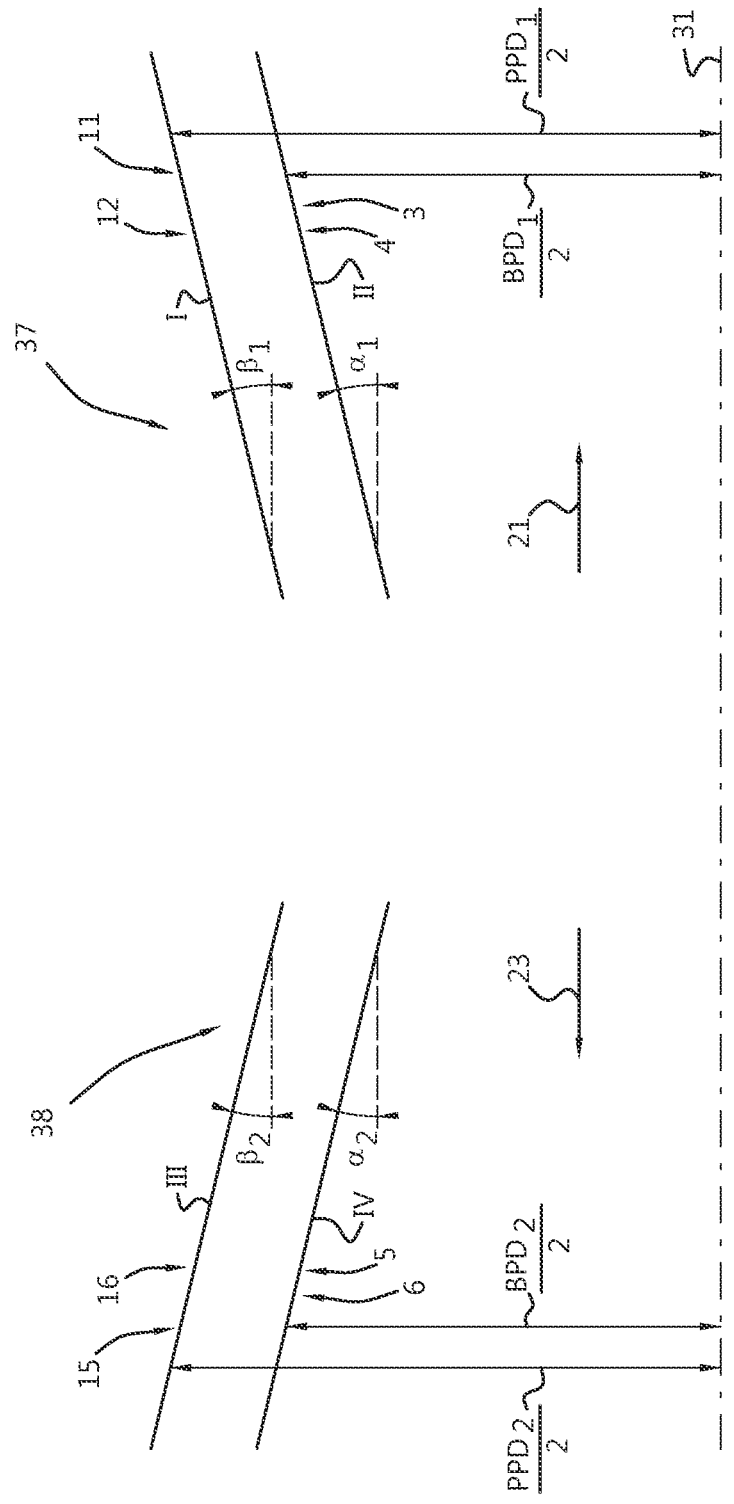
Figure 8:
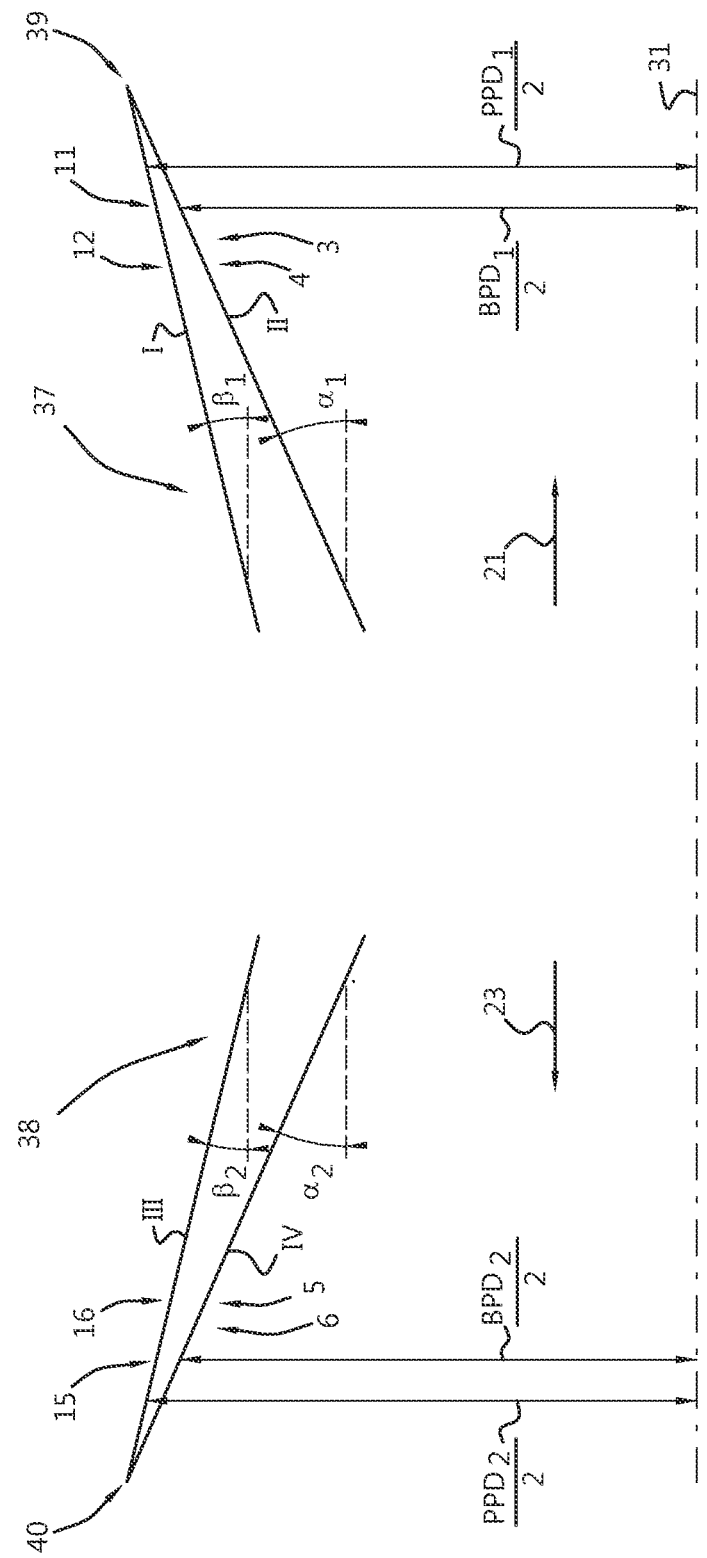
Figure 9:
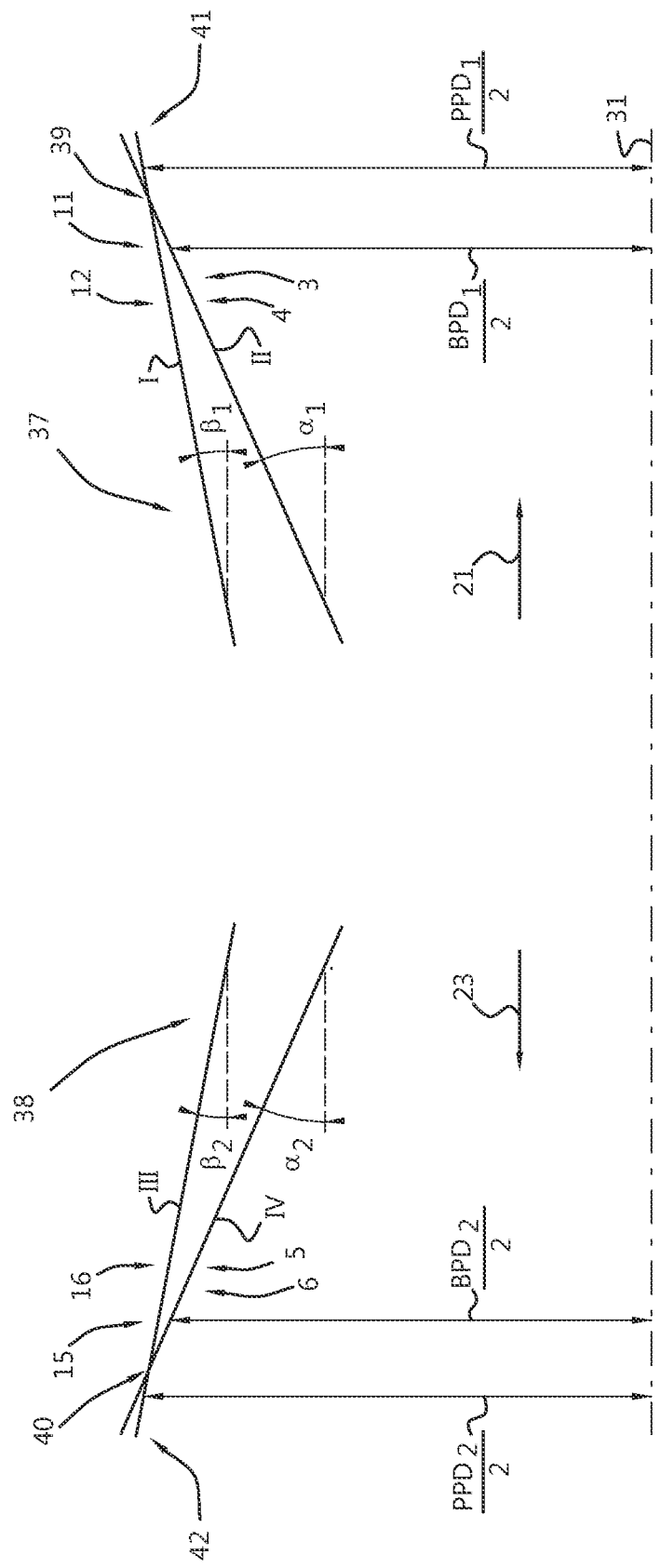

FIG. 4 contains graph 1 showing the hoop stresses in different embodiments of a threaded connection (b-n) having the construction of FIG. 1 and in a threaded connection (a) without rim part, FIG. 5 contains graph 2 showing the hoop stresses at the first seal starting position of the threaded connections (a-n) of graph 1, FIG. 6 contains graph 3 showing the hoop stresses at the first seal starting position of alternative embodiments a'-n' of the threaded connections of graph 2, FIG. 7 schematically shows a representation of the taper angles of the threaded connection of FIG. 1, FIG. 8 schematically shows a representation of the taper angles of a first alternative embodiment of the threaded connection according to the invention, and FIG. 9 schematically shows a representation of the taper angles of a second alternative embodiment of the threaded connection according to the invention.

DETAILED DESCRIPTION OF THE INVENTION

FIG. 1A shows a view in perspective of an embodiment of the threaded connection 1 according to the invention at final make-up 20. The threaded connection 1 for exploration and production of a hydrocarbon well comprises a coupling member 2, a first tubular member 9 and a second tubular member 13. Parts of the coupling member 2, the first tubular member 9 and the second tubular member 13 are cut out to show more details of the threaded connection 1. FIG. 1B shows a cross sectional view of the threaded connection of FIG. 1A. FIG. 2 shows an enlarged view of part II of FIG. 1A. FIG. 3 shows an enlarged view of part III of FIG. 2.

The threaded connection 1 defines a longitudinal axis 31. The coupling member 2 has a coupling outer diameter COD defined by an outer coupling surface 35, a first box part 3 comprising first inner threads 4, a second box part 5 comprising second inner threads 6, and a rim part 7 comprising a radially extending inner rim 8. The first box part 3 has a first box length FBL. The second box part 5 has a second box length SBL. The rim part 7 is located between the first box part 3 and the second box part 5 and has a radial rim part thickness B and an axial rim part length C. The first box part 3 and the second box part 5 have a radial box part thickness A located between, respectively, the inner rim 8 and the first inner threads 4 and the second inner threads 6. This means that the first box part 3 and the second box part 5 both have a radial box part thickness A. The radial box part thickness A of the first box part 3 is located between the first inner threads 4 and the inner rim 8. The radial box part thickness A of the second box part 5 is located between the second inner threads 6 and the inner rim 8.

More specifically, the radial box part thickness A of the first box part 3 and the second box part 5 is in axial direction along the longitudinal axis 31 located between the inner rim 8 and the first inner threads 4 and the second inner threads 6, respectively. The radial box part thickness A of the first box part 3 and the second box part 5 is measured in radial direction with respect to the longitudinal axis 31. The radial box part thickness A of the first box part 3 and the second box part 5 is measured from the outer coupling surface 35. The outer coupling surface 35 forms an outer thickness boundary 36 of the radial box part thickness A of the first box part 3 and the second box part 5.

In particular, it is noted that the coupling member 2 including the rim part 7 with the inner rim 8 revolves around the longitudinal axis 31. As such, the rim part 7 comprising the inner rim 8 is located at an axial distance from the first inner threads 4 and from the second inner threads 6. Accordingly, the radial box part thickness A of the first box part 3 and the second box part 5 is between the inner rim 8 and the first inner threads 4 and the second inner threads 6.

The first tubular member 9 comprises a first unthreaded tube part 10, and a first pin part 11 comprising first outer threads 12.

The second tubular member 13 comprises a second unthreaded tube part 14, and a second pin part 15 comprising second outer threads 16.

The first pin part 11 of the first tubular member 9 is in axial direction along the longitudinal axis 31 located between the inner rim 8 and the first unthreaded tube part 10, and the second pin part 15 of the second tubular member 13 is in axial direction along the longitudinal axis 31 located between the inner rim 8 and the second unthreaded tube part 14.

The first unthreaded tube part 10 and the second unthreaded tube part 14 have a tube outer diameter TOD and a radial tube wall thickness W.

The first tubular member 9 and the second tubular member 13 have a tube inner diameter TID.

The first inner threads 4, the second inner threads 6, the first outer threads 12, and the second outer threads 16 have dovetail wedge threads 17.

Dovetail wedge threads 17 are characterised by threads having a negative flank angle for their stab flanks and load flanks. The dovetail wedge threads 17 increase in width in opposite directions on the pin part and the corresponding box part. The rate at which the dovetail wedge threads 17 change in width is defined by a variable commonly known as a "wedge ratio". Wedge ratio (although technically not a ratio) refers to the difference between the stab flank lead and the load flank lead, which causes the dovetail wedge threads 17 to vary in width along the threaded connection. A "lead" of a thread refers to the differential distance between a component of a thread on consecutive threads. As such, the "stab flank lead" is the distance between stab flanks of consecutive thread pitches along the axial length of the threaded tubular connection.

The first inner threads 4 and the first outer threads 12 are configured to form a first inner primary seal 19 at final make-up 20. The second inner threads 6 and the second outer threads 16 are configured to form a second inner primary seal 18 at final make-up 20.

The term "make-up" refers to engaging the first and second pin parts 11, 15 into the first and second box parts 3, 5 and threading said parts together by applying a torque. The final make-up 20 refers to the situation that the make-up has been completed by threading the first and second pin parts 11, 15 and the first and second box parts 3, 5 together up to a desired amount of torque, or up to the first and second pin parts 11, 15 reach a specific position relative to the first and second box parts 3, 5.

The first inner primary seal 19 is formed by full contact between the first inner threads 4 and the first outer threads 12, and the second inner primary seal 18 is formed by full contact between the second inner threads 6 and the second outer threads 16.

The first and second inner primary seals 18, 19 form at final make-up 20 the first line of defence against internal pressure in the threaded connection 1.

The threaded connection 1 complies to;

$$COD > TOD$$

$$B = (COD - TID)/2$$

$$C > 0, \text{ and}$$

$$A < W.$$

COD>TOD indicates that the coupling outer diameter COD of the coupling member 2 is larger than the tube outer diameter TOD of the first unthreaded tube part 10 and the second unthreaded tube part 14.

When compared with the known threaded connection, the rim part 7 has been added between the first box part 3 and the second box part 5. The rim part 7 has the same outer dimensions as the first and second box parts 3, 5 and has an inner rim 8 extending internally in a radial direction towards the longitudinal axis 31 and located between the first pin part 11 of first tubular member 9 and the second pin part 15 of the second tubular member 13. The rim part 7 surrounds the longitudinal axis 31 completely and has a rim part thickness B measured in radial direction and a rim part length C measured in axial direction. The inner rim 8 is a circumferential rim surrounding the longitudinal axis 31.

B=(COD−TID)/2 indicates that the inner rim 8 extends from the coupling outer diameter COD of the coupling member up to the tube inner diameter TID. This facilitates the flowing of fluid through the threaded connection 1.

The rim part 7 comprises a rim inner surface 34 which is flush with a first tube inner surface 32 of the first tubular member 9 and a second tube inner surface 33 of the second tubular member 13.

C>0 indicates that the rim part 7 with an axial rim part length C has been added to the threaded connection.

The axial rim part length C may comply to; C≤31.75 mm (1.25 inch), preferably C≤27.94 mm (1.1 inch), more preferably C≤25.4 mm (1.0 inch).

The axial rim part length C may comply to; C≥6.35 mm (0.25 inch), preferably C≥10.16 mm (0.4 inch), more preferably C≥12.7 mm (0.5 inch).

The axial rim part length C may comply to; 20.32 mm (0.8 inch)≥C≥27.94 mm (1.1 inch), preferably C=25.4 mm (1.0 inch).

A<W indicates that the radial box part thickness A of the first and second box parts 3, 5 is smaller than the radial tube wall thickness W of the first and second unthreaded tube parts 10, 14 of the first and second tubular members 9, 13.

In order to withstand high internal pressures, the known threaded connections 1 typically have a radial box part thickness A which is larger than the radial tube part thickness W. This results in a large coupling outer diameter COD.

The rim part 7 of the threaded connection 1 according to the invention allows that the radial box part thickness A can be reduced while ensuring that the first and second inner primary seals 18, 19 are maintained when subjected to the high internal pressures. As a result, the threaded connection 1 with a smaller coupling outer diameter COD can be provided due to which the threaded connection 1 can be used in smaller diameter hydrocarbon wells, such as so-called slender profiled hydrocarbon wells sometimes referred to as slim-hole wellbores or slim-hole completions.

The largest diametric dimension of this type of threaded connection 1 is typically formed by the coupling outer diameter COD of the coupling member 2. For this type of threaded connection 1 for exploration and production of a hydrocarbon well, tubular members with a standardised tube outer diameter TOD are in typically used for the first and second tubular members 9, 13. To reduce the largest diametric dimension of the threaded connection 1 it is required to reduce the radial box part thickness A of the coupling member 2.

The radial box part thickness A and the radial tube wall thickness W may comply to; A≤0.9 W, preferably A≤0.8 W.

The radial box part thickness A and the radial tube wall thickness W may comply to; A≥0.7 W.

The radial box part thickness A is located at the critical cross section of the first box part 3 and the second box part 5.

The tube outer diameter TOD may comply to: 114.3 mm (4.5 inch)≤TOD≤244.5 mm (9⅝ inch), preferably 114.3 mm (4.5 inch)≤TOD≤193.7 mm (7.625 inch), more preferably 114.3 mm (4.5 inch)≤TOD≤139.7 mm (5.5 inch).

The radial tube wall thickness W may comply to: 6.3 mm (0.250 inch)≤W≤12.7 mm (0.500 inch), preferably 7.3 mm (0.290 inch)≤W≤11.1 mm (0.437 inch).

In a first direction 21 from the inner rim 8 and towards the first inner primary seal 19, the first inner threads 4 and the first outer threads 12 start to have full contact at a first seal starting position 22. In an opposite second direction 23 from the inner rim 8 and towards the second inner primary seal 18, the second inner threads 6 and the second outer threads 16 start to have full contact at a second seal starting position 24. The first seal starting position 22 is located at an axial seal distance D from the second seal starting position 24. The axial seal distance D is larger than the axial rim part length C. In other words, the axial seal distance D and the axial rim part length C comply to: D>C.

The part "first direction 21 from the inner rim 8 and towards the first inner primary seal 19" indicates the direction of the first direction 21. It does not indicate that the first direction 21 starts at the inner rim 8 and/or ends at the first inner primary seal 19. The part "second direction 23 from the inner rim 8 and towards the second inner primary seal 18" indicates the direction of the second direction 23. It does not indicate that the second direction 23 starts at the inner rim 8 and/or ends at the second inner primary seal 18.

The axial rim part length C and the axial seal distance D may comply to: 3.6 mm (0.142 inch)≤(D−C)/2≤9.9 mm (0.392 inch), preferably 5 mm (0.2 inch)≤(D−C)/2≤7.7 mm (0.3 inch), more preferably (D−C)/2 is 6.1 mm (0.242 inch).

The radially extending inner rim 8 is located between the first pin part 11 and the second pin part 15.

The first tubular member 9 (more specifically, the first pin part 11) comprises a first pin nose 25, the second tubular member 13 (more specifically, the second pin part 15) comprises a second pin nose 26, and at final make-up 20 the first pin nose 25 and the second pin nose 26 are located at a distance from the inner rim 8 (see FIG. 3).

The radially extending inner rim 8 is located between the first pin nose 26 and the second pin nose 26.

At final make-up 20, the threaded connection 1 is free from any further inner seal in addition to the first inner primary seal 19 and the second inner primary seal 18.

The first inner threads 4 and the first outer threads 12 together form a first thread step 27. The second inner threads 6 and the second outer threads 16 together form a second thread step 28. The threaded connection 1 is free from any further thread step. This means that there are no further thread steps in addition to the first thread step 27 and the second thread step 28. The first thread step 27 and the second thread step 28 are tapered thread steps.

The coupling member 2 comprises a first relief groove 29 located between the first inner threads 4 and the inner rim 8 and a second relief groove 30 located between the second inner threads 6 and the inner rim 8. More specifically, the first relief groove 29 is in axial direction along the longitudinal axis 31 located between the first inner threads 4 and the inner rim 8 and the second relief groove 30 is in axial direction along the longitudinal axis 31 located between the second inner threads 6 and the inner rim 8. The radial box part thickness A of the first box part 3 and the second box part 5 is located at the first relief groove 29 and at the second relief groove 20, respectively.

In the shown embodiment, the rim part 7 has a rim inner diameter RID which is equal to the tube inner diameter TID. In other words, the tube inner diameter TID and the rim inner diameter RID comply to; TID=RID. In other embodiments there may be a difference tube inner diameter TID and the rim inner diameter RID, for instance in the order of ±0.127 mm (0.050 inch).

The rim part 7 has a rim outer diameter ROD and radial rim part thickness B is equal to the difference between the rim outer diameter ROD and the rim inner diameter RID divided by two. In other words, the radial rim part thickness B, the rim outer diameter ROD, and the rim inner diameter RID comply to; B=(ROD−RID)/2.

The coupling outer diameter COD is equal to the rim outer diameter ROD. In other words, the coupling outer diameter COD and the rim outer diameter ROD comply to; COD=ROD.

The first box part 3 has a first box outer diameter FBOD, the second box part 5 has a second box outer diameter SBOD, which both are equal to the coupling outer diameter COD. In other words, the coupling outer meter COD, the first box outer diameter FBOD, and the second box outer diameter SBOD comply to; COD=FBOD=SBOD.

FIG. 4 contains graph 1 showing the hoop stresses in different embodiments of a threaded connection (b-n) having the construction of FIG. 1a and in a threaded connection (a) without rim part 7.

For all the threaded connections a-n, the tube outer diameter TOD is 139.7 mm (5.5 inch), the tube inner diameter TID is 121.3 mm (4.776 inch), the radial tube wall thickness W is 9.2 mm (0.361 inch), the coupling outer diameter COD is 148.6 mm (5.852 inch), and the radial box part thickness A is 6.9 mm (0.271 inch).

Graph 1 shows the hoop stresses in the threaded connections a-n over their normalised length for an internal pressure of 555 Bar (8050 PSI). The length of the threaded connections a-n is normalised from 0 to 1. The length of the normalization involves the distance between the distal end of the complete formed first threads and the distal end of the complete formed second threads. The end of the complete formed threads is where the complete formed threads pass into incomplete threads. The proximal end of the complete formed threads is the end closed to the rim, whereas the distal end of the complete formed threads is the end furthest away from the rim.

The vertical lines a-n indicate the respective first and second seal starting positions 22, 24 of the threaded connections a-n.

The threaded connection a is not part of the invention because it does not have a rim part 7 comprising a radially extending inner rim 8.

The threaded connections b-n have the same construction as the threaded connection a with the difference that a rim part 7 comprising a radially extending inner rim 8 has been added between first and second box parts 3, 5.

The threaded connections b-n differ from each other in that they have a different axial rim part length C. The axial rim part length C of the threaded connections b-n is indicated in table 1.

All the threaded connections b-n have a radial rim part thickness B of 13.64 mm (0.537 inch).

TABLE 1

| Threadd connection | Axial rim part length C | Hoop stress at first seal starting position |
|---|---|---|
| a | 0,00 mm (0.00 inch) | 5426,2 Bar (78700 PSI) |
| b | 2,54 mm (0.10 inch) | 5157,3 Bar (74800 PSI) |
| c | 5,08 mm (0.20 inch) | 4805,6 Bar (69700 PSI) |
| d | 6,35 mm (0.25 inch) | 4660,9 Bar (67600 PSI) |
| e | 7,62 mm (0.30 inch) | 4591,9 Bar (66600 PSI) |
| f | 10,16 mm (0.40 inch) | 4378,17 Bar (63500 PSI) |
| g | 12,7 mm (0.50 inch) | 4205,8 Bar (61000 PSI) |
| h | 15,24 mm (0.60 inch) | 4067,9 Bar (59000 PSI) |
| i | 20,32 mm (0.80 inch) | 3930,0 Bar (57000 PSI) |
| j | 25,4 mm (1.0 inch) | 3743,9 Bar (54300 PSI) |
| k | 27,94 mm (1.10 inch) | 3737,0 Bar (54200 PSI) |
| l | 31,75 mm (1.25 inch) | 3688,7 Bar (53500 PSI) |
| m | 38,1 mm (1.50 inch) | 3716,3 Bar (53900 PSI) |
| n | 43,18 mm (1.70 inch) | 3688,7 Bar (53500 PSI) |

The different positions of the first and second seal starting positions 22, 24 indicated in graph 1 by the vertical lines a-n are caused by the different axial rim part length C of the rim parts 7 of the threaded connections b-n.

The rim parts 7 of the threaded connections b-n are added between the first and second box parts 3, 5 of the threaded connection a. Compared with the threaded connection a, the length of the threaded connections b-n is increased (in axial direction) with an amount equal to their axial rim part length C.

FIG. 5 contains graph 2 showing the hoop stresses at the first seal starting position 22 of the threaded connections (a-n) of FIG. 4. Said hoop stresses are also indicate in table 1. Graph 1 indicates that the hoop stresses at the second seal starting positions 24 are the same as at the first seal starting positions 22.

If the radial deformation (and the associates hoop stress) at the first and second seal starting positions 22, 24 are too high, the first and second inner primary seals 18, 19 will be impaired due to the separation of the first inner threads 4 from the first outer threads 12 at the first seal starting position 22 and of the second inner threads 6 from the second outer threads 16 at the second seal starting position 24. Once separation at the first and second seal starting positions 22, 24 occurs due to the radial deformation caused by the internal pressure, the remainder of the first inner threads 4 will be separated easier from the remainder of the first outer threads 12 and the remainder of the second inner threads 6 will be separated easier from the rest of the second outer threads 16.

Comparing the threaded connection a (without rim part 7) with the threaded connections b-n (with rim part 7) in the graphs 1 and 2 reveals that the rim parts 7 reduce the hoop stresses in threaded connections b-n.

Especially the degree of hoop stresses at the first and second seal starting position 22, 24 are relevant, because too high hoop stresses (and associated radial deformations) at said first and second seal starting position 22, 24 will impair the first and second inner primary seals 18, 19. Beyond the first and second seal starting positions 22, 24, the hoop stresses (and associated radial deformations) are much less relevant, because the internal pressure does not go beyond the first and second seal starting positions 22, 24 when the first and second inner primary seals 18, 19 are maintained. The higher hoop stresses beyond first and second seal starting positions 22, 24 may be reduced by the alternative embodiments of the threaded connection according to the invention shown in the FIGS. 8 and 9.

The graphs 1 and 2 also reveal that the dimension of the axial rim part length C has an effect on the degree of reduction of the hoop stresses in the threaded connections b-n, and in particular at their first and second seal starting positions 22, 24. At first the reduction of hoop stresses at the first and second seal starting positions 22, 24 increases when the axial rim part length C increases, but said further reduction fades away when the axial rim part length C is further increased.

A too large axial rim part length C has the disadvantage that the total length of the coupling member 2 (sum of the first box length FBL of the first box part 3, the rim part length C of the rim part 7, and the second box length SBL of the second box part 5) increases without having additional benefit in terms of reduction of the hoop stresses at the first and second seal starting position 22, 24. Furthermore, adding more to the total length of the coupling will increase the cost in material. Still further, when exceeding a certain total length, may limit the use of certain field equipment for making-up the connection. A too small axial rim part length C has the disadvantage that the inner rim 8 can be damaged easily.

FIG. 6 contains graph 3 showing the hoop stresses at the first seal starting position 22 of alternative embodiments a'-n' of the threaded connections a-n of graph 2.

For all the threaded connections a'-n', the tube outer diameter TOD is 114.3 mm (4.5 inch), the tube inner diameter TID is 99.6 mm (3.920 inch), the radial tube wall thickness W is 7.4 mm (0.290 inch), the coupling outer diameter COD is 122 mm (4.803 inch), and the radial box part thickness A is 5.4 mm (0.213 inch).

Again, the threaded connection a' is not part of the invention because it does not have a rim part 7 comprising a radially extending inner rim 8.

Again, the threaded connections b'-n' differ from each other in that they have a different axial rim part length C. The axial rim part length C of the threaded connections b'-n' is indicated in table 2. All the threaded connections b'-n' have a radial rim part thickness B of 11.2 mm (0.442 inch).

The hoop stresses at the first seal starting position 22 of the threaded connections a'-n' for an internal pressure of 555 Bar (8050 PSI) are also indicated in table 2. The hoop stresses at the second seal starting positions 24 are the same as at the first seal starting positions 22.

TABLE 2

| Threaded connection | Axial rim part length C | Hoop stress at seal starting position |
|---|---|---|
| a' | 0,00 mm (0.00 inch) | 5191,8 Bar (75300 PSI) |
| b' | 2,54 mm (0.10 inch) | 4726,4 Bar (68550 PSI) |
| c' | 5,08 mm (0.20 inch) | 4429,9 Bar (64250 PSI) |
| d' | 6,35 mm (0.25 inch) | 4309,2 Bar (62500 PSI) |
| e' | 7,62 mm (0.30 inch) | 4267,9 Bar (61900 PSI) |
| f' | 10,16 mm (0.40 inch) | 4088,6 Bar (59300 PSI) |
| g' | 12,7 mm (0.50 inch) | 3957,6 Bar (57400 PSI) |
| h' | 15,24 mm (0.60 inch) | 3881,7 Bar (56300 PSI) |
| i' | 20,32 mm (0.80 inch) | 3792,1 Bar (55000 PSI) |
| j' | 25,4 mm (1.0 inch) | 3668,0 Bar (53200 PSI) |
| k' | 27,94 mm (1.10 inch) | 3681,8 Bar (53400 PSI) |
| l' | 31,75 mm (1.25 inch) | 3688,7 Bar (53500 PSI) |
| m' | 38,1 mm (1.50 inch) | 3778,3 Bar (54800 PSI) |
| n' | 43,18 mm (1.70 inch) | 3757,6 Bar (54500 PSI) |

The same effects as described in relation to the graphs 1 and 2 of the threaded connections a-n are revealed in graph 3 of the threaded connections a'-n'.

FIG. 7 shows the taper angles of the threaded connection 1 of FIG. 1a at final make-up 20. A view similar to FIG. 2 is used to provide a representation of the first pin pitch diameter $PPD_1$ of the first outer threads 12 of the first pin part 11, the first box pitch diameter $BPD_1$ of the first inner threads 4 of the first box part 3, the second pin pitch diameter $PPD_2$ of the second outer threads 16 of the second pin part 15, and the second box pitch diameter $BPD_2$ of the second inner threads 6 of the second box part 5.

Line I shows the variance of the first pin pitch diameter $PPD_1$ along the longitudinal axis 31. Line II shows the variance of the first box pitch diameter $BPD_1$ along the longitudinal axis 31. Line III shows the variance of the second pin pitch diameter $PPD_2$ along the longitudinal axis 31. Line IV shows the variance of the second box pitch diameter $BPD_2$ along the longitudinal axis 31.

The first inner thread taper angle $\alpha_1$ is the angle between the line I of the first pin pitch diameter $PPD_1$ and the longitudinal axis 31. The first outer thread taper angle $\beta_1$ is the angle between the line II of the first box pitch diameter $BPD_1$ and the longitudinal axis 31. The second inner thread taper angle $\alpha_2$ is the angle between the line III of the first pin pitch diameter $PPD_2$ and the longitudinal axis 31. The second outer thread taper angle $\beta_2$ is the angle between the line IV of the second box pitch diameter $BPD_2$ and the longitudinal axis 31.

FIG. 7 shows that the first inner threads 4 has a constant first inner threads taper angle $\alpha_1$ with respect to the longitudinal axis 31. The first outer threads 12 has a constant first outer threads taper angle $\alpha_1$ with respect to the longitudinal axis 31. The second inner threads 6 has a constant second inner threads taper angle $\alpha_2$ with respect to the longitudinal axis 31. The second outer threads 16 has a constant second outer threads taper angle $\beta_2$ with respect to the longitudinal axis 31.

The first inner threads taper angle $\alpha_1$ and the first outer threads taper angle $\beta_1$ are equal to each other. The second inner threads taper angle $\alpha_2$ and the second outer threads taper angle $\beta_2$ are equal to each other.

The first inner threads 4 and the first outer threads 12 have a first radial thread interference 37. The second inner threads 6 and the second outer threads 16 have a second radial thread interference 38.

The first inner threads taper angle $\alpha_1$, the first outer threads taper angle $\beta_1$, the second inner threads taper angle $\alpha_2$, and the second outer threads taper angle $\beta_2$ have a diametrical taper of between, and including, 0.36 and 0.86 mm/revolution (0.014 and 0.034 inch/revolution), preferably between, and including, 0.51 and 0.71 mm/revolution (0.020 and 0.028 inch/revolution).

To determine the first inner threads taper angle $\alpha_1$, one can measure on the first box part 3 the diametrical taper, which is the variance of the first box pitch diameter $BPD_1$ of the first inner threads 4 per revolution along the first inner threads 4, and the pitch, which is the displacement in axial direction per revolution along the first inner threads 4. Subsequently, the taper angle can be calculated according to:

$$\text{Tan (taper angle)} = \frac{0.5 \cdot (\text{diametrical taper})}{(\text{pitch})}$$

This applies in a similar manner to the first outer threads taper angle $\beta_1$, second inner thread taper angle $\alpha_2$, and second outer thread taper angle $\beta_2$.

FIG. 8 shows the taper angles of a first alternative embodiment of the threaded connection 1 according to the invention. This first alternative embodiment only differs from the threaded connection of FIG. 7 in that the first inner threads taper angle $\alpha_1$ is larger than the first outer threads taper angle $\beta_1$, and the second inner threads taper angle $\alpha_2$ is larger than the second outer threads taper angle $\beta_2$.

The first inner threads taper angle $\alpha_1$ and the second inner threads taper angle $\alpha_2$ have a diametrical inner taper of between, and including, 0.41 and 0.91 mm/revolution (0.016 and 0.036 inch/revolution), preferably between, and including, 0.56 and 0.76 mm/revolution (0.022 and 0.030 inch/revolution), and the first outer threads taper angle $\beta_1$ and the second outer threads taper angle $\beta_2$ have a diametrical outer taper of between, and including, 0.36 and 0.86 mm/revolution (0.014 and 0.034 inch/revolution), preferably between, and including, 0.51 and 0.71 mm/revolution (0.020 and 0.028 inch/revolution).

The first inner threads 4 and the first outer threads 12 are configured to have a first radial thread interference 37 at final make-up 20. The first radial thread interference 37 between the first inner threads 4 and the first outer threads 12 decreases in a first direction 21 from the inner rim 8 and towards the first inner primary seal 18 (see FIG. 1A). The second inner threads 6 and the second outer threads 16 are configured to have a second radial thread interference 38 at final make-up 20, and the second radial thread interference 38 between the second inner threads 6 and the second outer threads 16 decreases in an opposite second direction 23 from the inner rim 8 and towards the second inner primary seal 19 (see FIG. 1A). The decreasing first radial thread interference 37 and the decreasing second radial thread interference 38 reduce the higher hoop stresses which occur beyond the first and second seal starting positions 22, 24 when seen in the first and second direction 21, 23, respectively (see also the graph of FIG. 4).

More specifically, the first radial thread interference 37 between the first inner threads 4 and the first outer threads 12 decreases in the first direction 21 until a first radial thread interference value of zero is reached, and the second radial thread interference 38 between the second inner threads 6 and the second outer threads 16 decreases in the second direction 23 until a second radial thread interference value of zero is reached. The first inner threads 4 and the first outer threads 12 are in the first direction 21 and beyond a first thread location 39 where the first radial thread interference value of zero is reached free from a first radial thread clearance (see 41 of FIG. 9) between the first inner threads 4 and the first outer threads 12. The second inner threads 6 and the second outer threads 16 are in the second direction 23 and beyond a second thread location 40 where the second radial thread interference value of zero is reached free from a second radial thread clearance (see 42 of FIG. 9) between the second inner threads 6 and the second outer threads 16.

In another alternative embodiment of the threaded connection, the first radial thread interference 37 between the first inner threads 4 and the first outer threads 12 decreases in the first direction 21 until a first radial thread interference value larger than zero is reached, and the second radial thread interference 38 between the second inner threads 6 and the second outer threads 16 decreases in the second direction 23 until a second radial thread interference value of larger than zero is reached.

FIG. 9 shows the taper angles of a second alternative embodiment of the threaded connection according to the invention. This second alternative embodiment only differs from the threaded connection of FIG. 8 in that the first inner threads 4 and the first outer threads 12 have in the first direction 21 and beyond a first thread location 39 where the first radial thread interference 37 value of zero is reached a first radial thread clearance 41 between the first inner threads 4 and the first outer threads 12, and the second inner threads 6 and the second outer threads 16 have in the second direction 23 and beyond a second thread location 40 where the second radial thread interference value of zero is reached a second radial thread clearance 42 between the second inner threads 6 and the first outer threads 16.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

It will be apparent to those skilled in the art that various modifications can be made to the threaded connection without departing from the scope as defined by the claims.

The invention claimed is:

1. A threaded connection for exploration and production of a hydrocarbon well and comprising:
a coupling member having a coupling outer diameter COD and comprising:
a first box part comprising first inner threads,
a second box part comprising second inner threads, and
a rim part comprising a radially extending inner rim, wherein the rim part is located between the first box part and the second box part and has a radial rim part thickness B and an axial rim part length C, and
the first box part and the second box part have a radial box part thickness A located between the inner rim and the first inner threads and the second inner threads, respectively,
a first tubular member comprising a first unthreaded tube part, and a first pin part comprising first outer threads, and
a second tubular member comprising a second unthreaded tube part, and a second pin part comprising second outer threads, wherein
the first unthreaded tube part and the second unthreaded tube part have a tube outer diameter TOD and a radial tube wall thickness W,
the first tubular member and the second tubular member have a tube inner diameter TID,
the first inner threads, the second inner threads, the first outer threads, and the second outer threads have dovetail wedge threads,
the first inner threads and the first outer threads are configured to form a first inner primary seal at final make-up,
the second inner threads and the second outer threads are configured to form a second inner primary seal at final make-up, and
the threaded connection satisfies the following conditions:
COD>TOD $B=$about$((COD-TID)/2)$ $C>0$, and $A<W$.

2. The threaded connection according to claim 1, wherein the threaded connection satisfies the following condition: C≤31.75 mm (1.25 inch).

3. The threaded connection according to claim 1, wherein the threaded connection satisfies the following condition:

$C \geq 61.35$ mm (0.25 inch)

4. The threaded connection according to claim 1, wherein the threaded connection satisfies the following condition:
20.32 mm (0.8 inch)≤C≤27.94 mm (1.1 inch).

5. The threaded connection according to claim 1, wherein the threaded connection satisfies the following condition:

$A \leq 0.9 \, W$.

6. The threaded connection according to claim 1, wherein the radial box part thickness A is located at a critical cross section of the first box part and the second box part.

7. The threaded connection according to claim 1, wherein;
in a first direction from the inner rim and towards the first inner primary seal, the first inner threads and the first outer threads start to have full contact at a first seal starting position,
in an opposite second direction from the inner rim and towards the second inner primary seal, the second inner threads and the second outer threads start to have full contact at a second seal starting position,
the first seal starting position is located at an axial seal distance D from the second seal starting position, and
the threaded connection satisfies the following condition:

$D>C$.

8. The threaded connection according to claim 7, wherein the threaded connection satisfies the following condition:

3.6 mm (0.142 inch)≤$(D-C)/2$≤9 mm (0.392 inch).

9. The threaded connection according to claim 1, wherein at final make-up, the threaded connection is free from any further inner seal.

10. The threaded connection according to claim 1, wherein:
the first inner threads and the first outer threads together form a first thread step, and
the second inner threads and the second outer threads together form a second thread step, wherein the threaded connection is free from any further thread step.

11. The threaded according to claim 1, wherein:
the threaded connection defines a longitudinal axis,
the first inner threads has a constant first inner threads taper angle $\alpha 1$ with respect to the longitudinal axis,
the first outer threads has a constant first outer threads taper angle $\beta 1$ with respect to the longitudinal axis,
the first inner threads taper angle $\alpha 1$ larger than the first outer threads taper angle $\beta 1$,
the second inner threads has a constant second inner threads taper angle $\alpha 2$ with respect to the longitudinal axis,
the second outer threads has a constant second outer threads taper angle $\beta 2$ with respect to the longitudinal axis, and
the second inner threads taper angle $\alpha 2$ is larger than the second outer threads taper angle $\beta 2$.

12. The threaded connection according to claim 11, wherein:
the first inner threads and the first outer threads are configured to have a first radial thread interference at final make-up,
the first radial thread interference between the first inner threads and the first outer threads decreases in a first direction from the inner rim and towards the first inner primary seal,
the second inner threads and the second outer threads are configured to have a second radial thread interference at final make-up, and
the second radial thread interference between the second inner threads and the second outer threads decreases in an opposite second direction from the inner rim and towards the second inner primary seal.

13. The threaded connection according to claim 1, wherein the coupling outer diameter COD is the largest diametric dimension of the threaded connection.

14. The threaded connection according to claim 1, wherein the rim part has a rim inner diameter RID and the threaded connection satisfies the following condition:

RID=TID+0.127 mm (0.050 inch).

15. The threaded connection according to claim 1, wherein the rim part has a rim outer diameter ROD and the threaded connection satisfies the following condition:
COD=ROD, and wherein the first box part has a first box outer diameter FBOD, the second box part has a second box outer diameter SBOD, and the threaded connection satisfies the following condition:
COD=FBOD=SBOD.

16. The threaded connection according to claim 1, wherein the threaded connection satisfies the following condition:

$C$≤27.94 mm (1.1 inch).

17. The threaded connection according to claim 1, wherein the threaded connection satisfies the following condition:

$C$≥10.16 mm (0.4 inch).

18. The threaded connection according to claim 1, wherein the threaded connection satisfies the following condition:

$C$=25.4 mm (1.0 inch).

19. The threaded connection according to claim 1, wherein the threaded connection satisfies the following condition:

$A$≤0.7 W.

20. The threaded connection according to claim 1, wherein the threaded connection satisfies the following condition:

$A$≤0.8 W.

21. The threaded connection according to claim 1, wherein:
in a first direction from the inner rim and towards the first inner primary seal, the first inner threads and the first outer threads start to have full contact at a first seal starting position,
in an opposite second direction from the inner rim and towards the second inner primary seal, the second inner threads and the second outer threads start to have full contact at a second seal starting position,
the first seal starting position is located at an axial seal distance D from the second seal starting position, and
the threaded connection satisfies the following condition:

5 mm (0.2 inch)≤$(D-C)/2$≤7.7 mm (0.3 inch).

22. The threaded connection according to claim 1, wherein:
in a first direction from the inner rim and towards the first inner primary seal, the first inner threads and the first outer threads start to have full contact at a first seal starting position,
in an opposite second direction from the inner rim and towards the second inner primary seal, the second inner threads and the second outer threads start to have full contact at a second seal starting position,
the first seal starting position is located at an axial seal distance D from the second seal starting position, and
the threaded connection satisfies the following condition:

$(D-C)/2$=6.1 mm (0.242 inch).

23. The threaded connection according to claim 1, wherein:
the rim part comprises a rim inner diameter RID; and
the threaded connection satisfies the following condition:

RID=TID.

* * * * *